United States Patent

Gagnon

[11] Patent Number: 5,959,773
[45] Date of Patent: Sep. 28, 1999

[54] PARALLEL PLATE BEAM SPLITTER CONFIGURATION IN HIGH INDEX GLASS

[75] Inventor: Ralph J. Gagnon, Chico, Calif.

[73] Assignee: Hughes-JVC Technology Corporation, Carlsbad

[21] Appl. No.: 08/915,149

[22] Filed: Aug. 20, 1997

[51] Int. Cl.[6] .................................................. G02B 5/30
[52] U.S. Cl. ............................... 359/495; 349/5; 349/8; 349/9; 359/487; 359/496
[58] Field of Search ....................... 349/5, 8, 9; 359/487, 359/495, 499; 362/20

[56] References Cited

U.S. PATENT DOCUMENTS

| | | |
|---|---|---|
| 4,127,322 | 11/1978 | Jacobson et al. . |
| 4,836,649 | 6/1989 | Ledebuhr et al. .......................... 349/8 |
| 5,153,752 | 10/1992 | Kurematsu et al. ....................... 359/40 |
| 5,229,872 | 7/1993 | Mumola .................................... 359/40 |
| 5,267,029 | 11/1993 | Kurematsu et al. . |
| 5,530,489 | 6/1996 | Henderson et al. . |
| 5,577,826 | 11/1996 | Kasama et al. . |
| 5,625,491 | 4/1997 | von Gunten et al. . |

FOREIGN PATENT DOCUMENTS 0 083 090   7/1983   European Pat. Off. .

*Primary Examiner*—Thong Nguyen
*Assistant Examiner*—Craig Curtis
*Attorney, Agent, or Firm*—Harness, Dickey & Pierce, P.L.C.

[57] ABSTRACT

Color and/or polarization beam splitters are used in a multi-color light valve projection systems. The color and/or polarization beam splitters each include first and second prisms with a thin-film stack located therebetween. The prisms are made of glass which has an index of refraction between 1.65 and 1.85. The color and polarization beam splitters operate at an angle of incidence of 45 degrees. By operating at 45 degrees, the color and/or polarization beam splitters can be assembled in a compact and parallel manner and thereby reduce the size of the color and/or polarization beam splitter while increasing the contrast of the light valve projection system. The high index of refraction glass also produces a smaller optical path for a given physical path. The disadvantages associated with index of refraction oil prisms are also eliminated.

26 Claims, 3 Drawing Sheets

PARALLEL PLATE BEAM SPLITTER CONFIGURATION IN HIGH INDEX GLASS

BACKGROUND OF THE INVENTION

1. Technical Field

This invention relates to beam splitters and, more particularly, to parallel plate polarizing and color beam splitters for liquid crystal displays.

2. Discussion

The angle at which a thin-film MacNeille polarizer is effective is determined by the indices of refraction of three materials. The first two materials are the alternating materials that make up the thin-film reflecting stack. The third material is the surrounding medium whose index of refraction may be different than either of the two materials used for the thin-film stack.

The thin-film stack is typically made of alternating layers of a first material with a high index of refraction ($n_H$) and a second material with a low index of refraction ($n_L$). At a special angle, Brewster's angle, the reflectance for P-polarized light entirely vanishes. In the low index of refraction material, this angle is computed by $$\theta_B = \arctan\left(\frac{n_H}{n_L}\right).$$

In the high index material, the corresponding angle is the complement of $\theta_B$. The object of the thin-film polarizer design is to use Brewster's angle to minimize the reflectance of P-polarized light while maximizing the reflectance of S-polarized light.

If the index of refraction of the external medium ($n_E$) is not equal to $n_L$, additional refraction takes place. The polarizing angle $\theta_E$ in the external medium can be found using Snell's Law:

$$n_E \sin(\theta_E) = n_L \sin(\theta_B)$$

or, $$\theta_E = \arcsin\left(\frac{n_L \sin\theta_B}{n_E}\right).$$

Because the interface between the stack and the external medium does not operate at Brewster's angle when $n_E \neq n_L$, a small amount of reflectance of P-polarized light is generated by the interface.

High contrast also occurs when the color and polarization beam splitters are parallel. The most convenient angle for a polarizing and/or color beam splitters is usually 45°. A 45° prism takes less space or volume than a prism operating at a higher angle.

A beam splitter which operates at 45° is impossible with a two-component system ($n_E = n_L$) for the following reason. The only solutions to the equation $$45° = \arctan\left(\frac{n_H}{n_L}\right)$$

requires that $n_H = n_L$. However, when $n_H = n_L$, there is no reflection for P-polarized or S-polarized light. Therefore, the third material for the external medium must be introduced to keep the external angle at 45° while permitting the internal Brewster angle to be larger than 45°. This, however, means that the index of refraction of the external medium must be larger than the index of refraction of the low index material in the stack. The only suitable external medium having a sufficiently high index of refraction and sufficiently low birefringence to allow high-contrast operation at 45° is oil.

Liquid oil prisms include a thin-film polarizing stack formed on a thin plate which is placed in a tank containing oil. The oil, however, is source of additional problems. A large external medium index of refraction will normally facilitate superior polarizing, but as the index of refraction goes up, the quality of the oil usually goes down and gives rise to additional problems. The liquid oil prism provides a less than perfect match to the corresponding glass substrate. Undesirable absorption of blue light is also common. The intense beams of light traversing the liquid oil prism also cause chemical decomposition. Absorption of infrared and visible energy also increases thermally generated convection currents and pressure on the tank which requires special methods and apparatus for relief of the currents and pressure.

Therefore, it would be desirable to provide polarizing and color beam splitters which operate at an incidence angle of 45° and operate in an external medium which does not have the disadvantages of index of refraction oil and liquid prisms. Preferably the polarizing and color beam splitters have high contrast.

SUMMARY OF THE INVENTION

Color and/or polarization beam splitters according to the present invention are used in a multi-color light valve projection systems. The color and/or polarization beam splitters each include first and second prisms with a thin-film stack located therebetween. The prisms are made of glass which has an index of refraction between 1.65 and 1.85. The color and polarization beam splitters operate at an angle of incidence of 45 degrees.

By operating at 45 degrees, the color and/or polarization beam splitters can be assembled in a compact and parallel manner and thereby reduce the size of the color and/or polarization beam splitter while increasing the contrast of the light valve projection system. The high index of refraction glass also produces a smaller optical path for a given physical path. The disadvantages associated with index of refraction oil prisms are also eliminated.

Other objects, features and advantages will be readily apparent.

BRIEF DESCRIPTION OF THE DRAWINGS

The various advantages of the present invention will become apparent to those skilled in the art after studying the following specification and by reference to the drawings in which.

DETAILED DESCRIPTION

Figure 1:
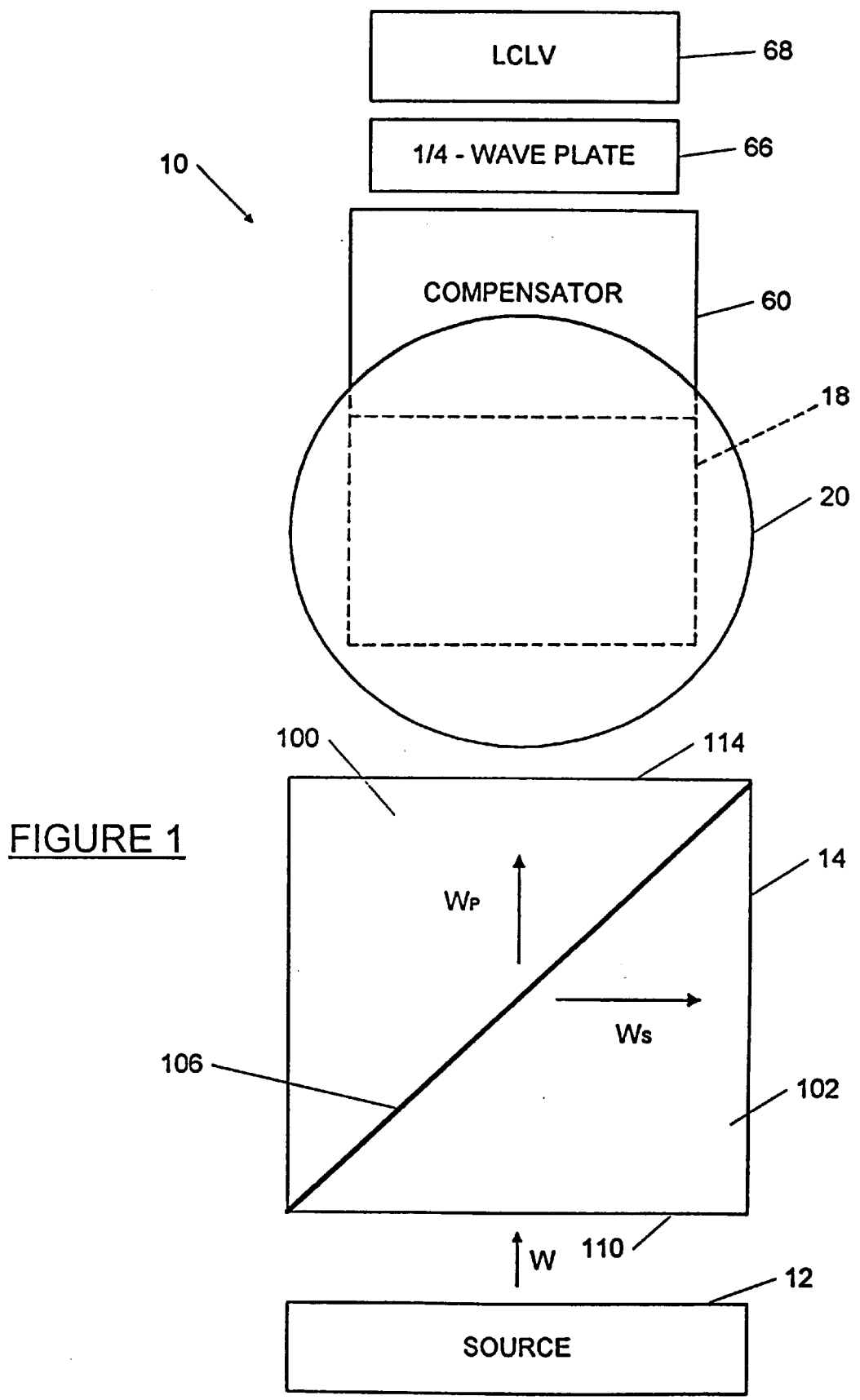
FIG. 1 is an end view of a beam splitter according to the present invention.
Figures 2, 2A:
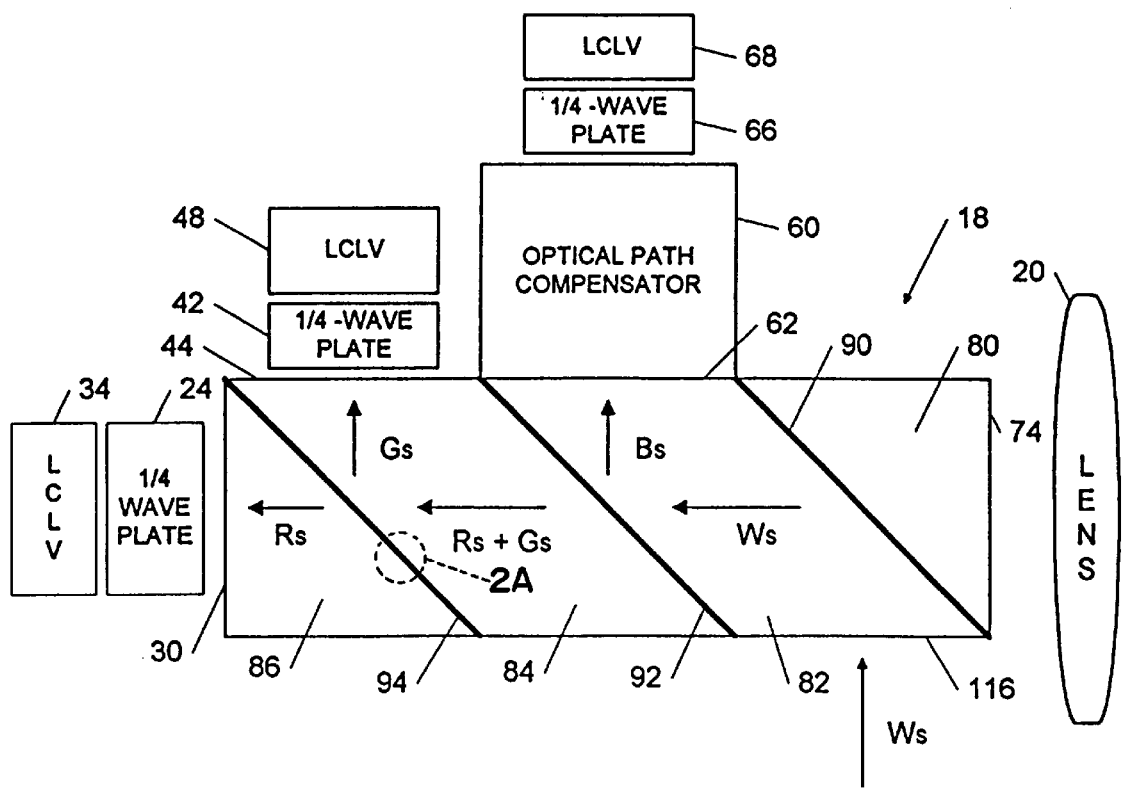
FIG. 2 is a side view of the beam splitter of FIG. 1 which illustrates the path of incident light on the beam splitter.
FIG. 2A is an isolated side view of the beam splitter thin-film stack shown in FIG. 2.

Referring to FIGS. 1 and 2, an optical system 10 is illustrated and includes a light source 12 of unpolarized light. Optical system 10 further includes a prepolarizer 14, a main polarizer and color beam splitter 18, and a projection lens 20.

A first quarter-wave plate 24 is located adjacent a facet 30 of main polarizer and color beam splitter 18. A first liquid crystal light valve (LCLV) 34 is located adjacent quarter-wave plate 24. A first cathode ray tube (CRT) (not shown) is located adjacent first LCLV 34.

A second quarter-wave plate 42 is located adjacent facet 44 of main polarizer and color beam splitter 18. A second LCLV 48 is located adjacent second quarter-wave plate 42. A second CRT (not shown) is located adjacent second LCLV.

An optical path compensator 60 abuts a facet 62 of main polarizer and color beam splitter 18. A third quarter-wave plate 66 lies adjacent optical path compensator 60. A third LCLV 68 is located adjacent third quarter-wave plate 66. A third CRT (not shown) is located adjacent third LCLV 68. The projection lens 20 is positioned adjacent facet 74 of the color beam splitters 18.

Main polarizer and color beam splitter 18 includes first, second, third and fourth prisms 80, 82, 84 and 86. A first thin-film stack 90 associated with the main polarizer is sandwiched between first and second prisms 80 and 82. A second thin-film stack 92 associated with a first color beam splitter is sandwiched between second and third prisms 82 and 84. A third thin-film stack 94 associated with a second color beam splitter is sandwiched between third and fourth prisms 84 and 86. Preferably, as shown in FIG. 2A, the thin-film stack 94 includes alternating layers of a first material having a high index of refraction, such as the layer H, a second material having a low index of refraction, such as the layer L, and two layers M each having a medium index of refraction that interface the stack within the adjacent prisms 84, 86. Thin film stacks 90, 92, are similar in structure to the thin-film stack 94, although the number and thickness of layers used in each stack may vary according to specific design parameters.

Preferably, first, second, third and fourth prisms 80, 82, 84 and 86 are made of glass having a high index of refraction. Preferably the glass has an index of refraction between 1.65 to 1.85. More preferably, the glass has an index of refraction between 1.75 and 1.85. Such glass is currently available from Nikon Corp. In a highly preferred embodiment, the glass has an index of refraction of 1.83 and low birefringence.

Referring to FIG. 1, prepolarizer 14 includes first and second prisms 100 and 102. A fourth thin-film stack 106 is sandwiched between first and second prisms 100 and 102. First and second prisms 100 and 102 are also preferably made of glass having a high index of refraction similar to the glass of prisms 80, 82, 84 and 86.

In use, unpolarized light W is directed along a first optical axis by light source 12 onto a facet 110 of second prism 102. Unpolarized light W is incident upon the fourth thin-film stack 106. S-polarized light ($W_S$) is reflected by fourth thin-film stack 106 in a direction perpendicular to the first optical axis. Fourth thin-film stack 106 transmits P-polarized light ($W_P$) along the first optical axis towards facet 114.

Referring to FIG. 2, first, second, and third thin-film stacks 90, 92 and 94 are rotated 90° with respect to fourth thin-film stack 106 of prepolarizer 14. Therefore, P-polarized light ($W_P$) exiting at 114 is S-polarized ($W_S$) with respect to main polarizer and color beam splitter 18. S-polarized light ($W_S$) is incident upon facet 116 of color beam splitter 18. S-polarizer light ($W_S$) is reflected by first thin-film stack 90 along a second optical axis. First thin-film stack 90 operates in a manner similar to fourth thin-film stack. In other words, S-polarized light is reflected while P-polarized light is transmitted.

S-polarized light ($W_S$) is incident upon second thin-film stack 92 which reflects blue light and transmits red and green light. The S-polarized blue light ($B_S$) is reflected by second thin-film stack 92 through optical path compensator 60 and quarter-wave plate 66 onto the third LCLV. The third LCLV modulates the S-polarized blue light in a conventional manner.

The S-polarized red and green light ($R_S+G_S$) is transmitted by second thin-film stack 92 and is incident upon third thin-film stack 94. Third thin-film stack 94 transmits red light and reflects green light. The red and green light passes through quarter-wave plates 24 and 42, respectively and is incident upon the first and second LCLV's 34 and 48. The first and second LCLV's modulate the red and green light in a conventional manner.

Figure 3:
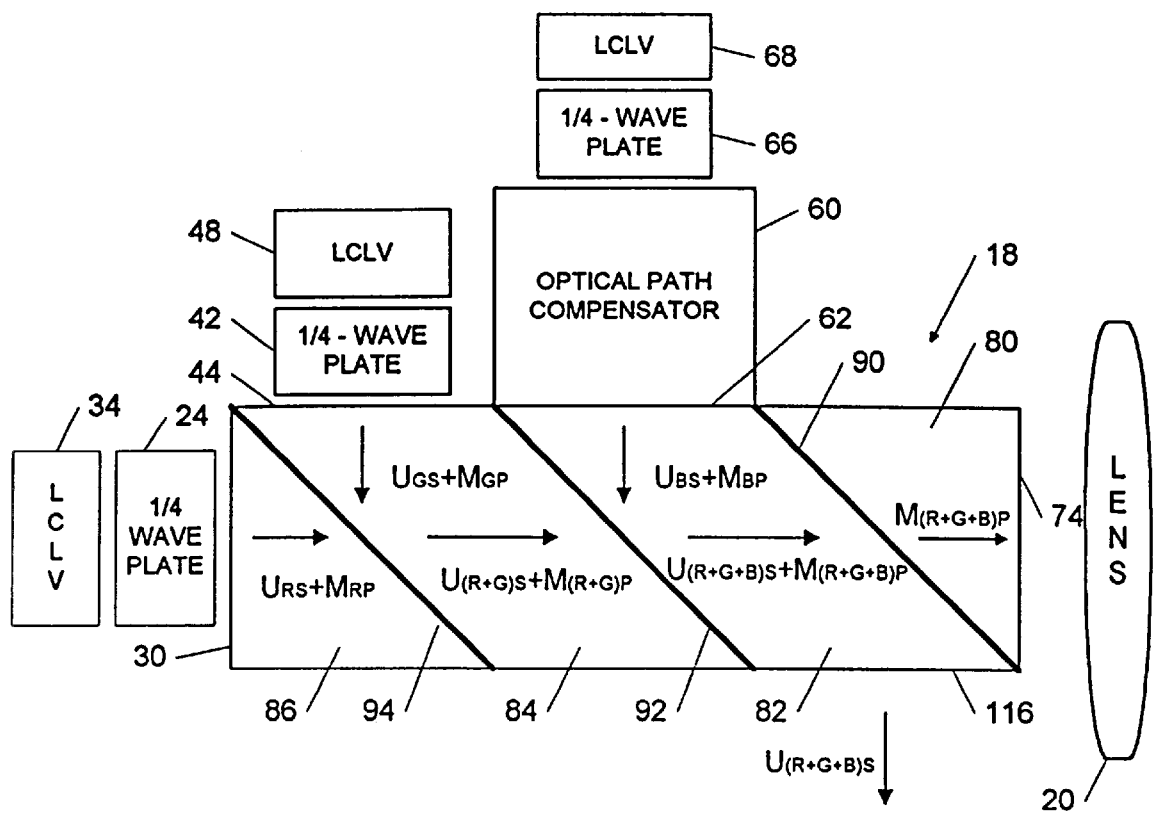
FIG. 3 is a side view similar to FIG. 2, illustrating the path of modulated and unmodulated light reflected by the light valves.
Figure 3:
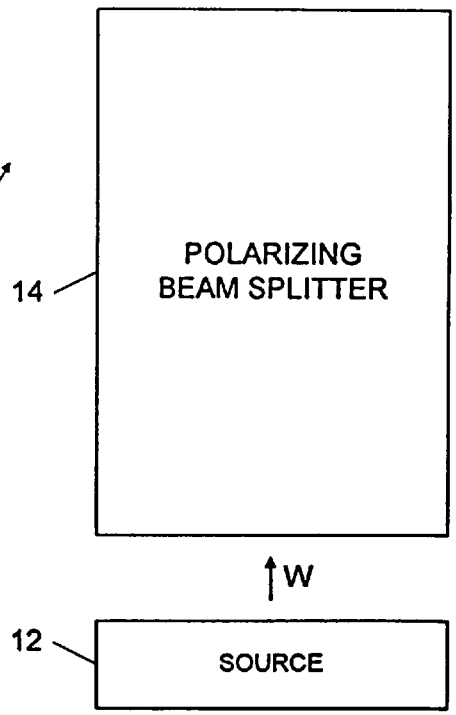

Referring to FIGS. 2 and 3, when S-polarized blue light ($B_S$) is incident upon LCLV 68, the third CRT and LCLV 68 modulate the blue light to obtain a desired image. The third CRT selectively illuminates portions of LCLV 68 and leaves other portions dark. Portions of LCLV 68 which are illuminated rotate the S-polarized light into P-polarized light. Portions which remain dark simply reflect the S-polarized light.

In FIG. 3, the reflected S-polarized light is indicated as unmodulated S-polarized blue light ($U_{BS}$). The reflected P-polarized light is indicated as modulated P-polarized blue light ($M_{BP}$). Likewise, LCLV 48 provides unmodulated S-polarized green light ($U_{GS}$) and modulated green P-polarized light ($M_{RP}$). Finally, LCLV 34 provides unmodulated red S-polarized light ($U_{RS}$) and modulated red P-polarized light ($M_{RP}$). First thin-film stack 90 transmits modulated red, green and blue P-polarized light ($M_{(R+G+B)P}$) and reflects unmodulated red, green and blue S-polarized light ($U_{(R+C+B)S}$) towards prepolarizer 14 and source 12.

By employing glass having a high index of refraction and low birefringence, polarizing and color beam splitters operating at an incidence angle of 45° can be realized. Such polarizing and color beam splitters circumvent problems associated with prisms employing optical oil as previously described. Furthermore, a 45° prism takes less space than a prism operating at a higher angle of incidence. The high index of the glass also produces a smaller optical path for given physical path. Because the color beam splitters and the polarizing beam splitters plates are all parallel and in the same index of refraction medium, the contrast ratio is significantly increased.

The following approximated calculations presume zero birefringence because the high index glass has very low birefringence. With a quarter-wave plate, polar angle of 5°, and averaged over twelve different azimuth angles, the performance of this beam splitter combination is as follows (The following calculation was performed with a computer model):

Nearest color temperature=5534 K.

CIE color coordinates:

| COLOR | X | Y | Z | EFFICIENCY |
| --- | --- | --- | --- | --- |
| Red | 0.671 | 0.306 | 0.023 | 9.6 |
| Green | 0.348 | 0.616 | 0.036 | 37.8 |
| Blue | 0.142 | 0.056 | 0.802 | 3.3 |
| White | 0.335 | 0.335 | 0.331 | |

PHOTOPIC EFFICIENCY=50.7
PHOTOPIC CONTRAST:
Red 1315; Green 1890; Blue 209; and White 1176.

The calculations of contrast assume the use of a quarter-wave plate at the light valve. Without the quarter-wave plate, the contrast is reduced. The following is a calculation without the quarter-wave plate:

Nearest color temperature=5534 K.

CIE color coordinates:

| COLOR | X | Y | Z | EFFICIENCY |
|-------|-----|-----|-----|------------|
| Red   | 0.671 | 0.306 | 0.023 | 9.6 |
| Green | 0.348 | 0.616 | 0.036 | 37.8 |
| Blue  | 0.142 | 0.056 | 0.802 | 3.3 |
| White | 0.335 | 0.335 | 0.331 | |

PHOTOPIC EFFICIENCY=50.7
PHOTOPIC CONTRAST:
Red 209; Green 170; Blue 112; and White 170.
Therefore, quarter-wave plates are preferably employed.

Because of the variation of filter cutoff wavelength with incidence angle, the colors of the three channels are actually a function of incidence angle. When averaging over all the incidence angles in the illumination cone, a satisfactory result of the colors is typically found. If a color depends on a distribution of incidence angles, and the distribution of incidence angles varies across the object field, then the primary color will vary across the object field. Because the filters are sensitive to variations in incidence angles, the illumination system should not allow variations in the distribution of incidence angles from point to point in the object field. Color filters in glass are more sensitive to incidence angle variations than are color filters in air.

A. 45° PBS IN HIGH INDEX GLASS

Prepolarizer 14 and main polarizer (first thin-film stack 90) reflect S-polarization in the band of 430 to 680 nanometers (nm) with maximum reflectance, and transmit P-polarization in the band of 430 to 680 nm with maximum transmittance. The optimum angle for P transmittance should be 45°. The range of angles over which the polarizer will be used is 40° to 50° in air (42.27° to 47.73° in glass). The external medium is high index glass with an index of refraction of 1.83.

Prepolarizer 14 preferably has the following performance specifications:

1. Half-power bandwidth for S reflection >300 nm;
2. For the wavelength range from 490 to 610 nm, average transmittance of S-polarization <0.0004 and average reflectance of P-polarization <0.002;
3. For the wavelength range from 430 to 680 nm, maximum transmittance of S-polarization <0.003 and maximum reflectance of P-polarization <0.004;
4. Angles of incidence between 40° air (42.27° glass) and 50° air (47.73° glass); and
5. For the wavelength range from 450 to 650 nm, average reflectance of P-polarization <0.12.

The foregoing are preferred construction materials for prepolarizer 14 and first thin-film stack 90:

Glass 1.83; L 1.52; M 2.13; and T 2.47 where L="low"; M="medium"; and T="titanium dioxide". n=1.52 e.g. $Si_2O_3$, $ThF_4$; n=2.13 e.g. $Ta_2O_5$, $Z_rO_2$; n=2.47 e.g. $TiO_2$. The thin-film materials are not specified because the thin-film specialist may achieve the required index by blending materials. Thickness data for the thin-films are given in normal-incidence quarter-wave units at wavelength 550 nm:

Glass

| | | | | |
|---|---|---|---|---|
| 1.200 M (1) | 0.471 T (2) | 2.021 L (3) | 1.350 T (4) | 2.600 L (5) |
| 1.409 T (6) | 1.745 L (7) | 1.048 T (8) | 1.525 L (9) | 0.988 T (10) |
| 1.532 L (11) | 1.033 T (12) | 1.643 L (13) | 1.007 T (14) | 4.146 L (15) |
| 0.482 T (16) | 1.257 M (17) | | | |

Glass

B. 45° BLUE REFLECTOR IN HIGH INDEX GLASS

The first color beam splitter (thin-film stack 92) preferably reflects S and P-polarization blue wavelengths at 45° incidence angle in glass having a high index of refraction equal to 1.83. Because it is difficult to reflect P-polarizations, a large number of thin-film layers are employed. Also, the variation of the 50% reflectance point, both with respect to incidence angle and with respect to polarization, becomes important. These variations should be held to a minimum over an angle range of 42.3° to 47.7° while at the same time the reflectance of blue P-polarization is held at a high value.

Thin-film stack 92 preferably has the following performance specifications:

1. Angle of incidence: 45°;
2. Averaging of 50% reflection points for S and P-polarization: 500 nm;
3. Difference between S and P 50% reflection points: <35 nm;
4. Shift in S and P 50% reflection points between 45° and 47.7°: <27 nm;
5. For the wavelength range from 425 to 480 nm, average transmittance of S-polarization <0.0001;
6. For the wavelength range from 440 to 480 nm, maximum transmittance of P-polarization <0.05 and average transmittance of P-polarization <0.015;
7. For the wavelength range from 525 to 680 nm, maximum reflectance of S-polarization <0.0075 and average reflectance <0.002; and
8. For the wavelength range from 525 to 680 nm, average reflectance of P-polarization <0.001.
9. Angle of incidence: 47.7° (50° in air) ;
10. For the wavelength range from 440 to 480 nm, average transmittance of S-polarization <0.001.
11. Angle of incidence: 42.3° (40° in air);
12. For the wavelength range from 465 to 480 nm, average transmittance of P-polarization <0.35;
13. For the wavelength range from 545 to 680 nm, maximum reflectance of S-polarization <0.05 and average reflectance of S-polarization <0.005.

The foregoing are preferred construction materials for thin-film stack 92:

Glass 1.83; L 1.46; and M 1.83 where L="low", n=1.46 e.g. $SiO_2$; M="medium", n=1.83 e.g. $Y_2O_3$, $ThO_2$. Thickness data are given in normal-incidence quarter-wave units at a wavelength of 500 nm;

Glass

| | | | | |
|---|---|---|---|---|
| 0.343 L (1) | 4.530 M (2) | 0.985 L (3) | 4.066 M (4) | 1.786 L (5) |
| 3.731 M (6) | 2.224 L (7) | 3.715 M (8) | 1.857 L (9) | 3.824 M (10) |
| 1.549 L (11) | 3.795 M (12) | 1.597 L (13) | 3.736 M (14) | 1.980 L (15) |
| 3.771 M (16) | 1.952 L (17) | 3.877 M (18) | 1.965 L (19) | 3.754 M (20) |
| 2.325 L (21) | 3.584 M (22) | 2.120 L (23) | 3.626 M (24) | 1.578 L (25) |
| 3.745 M (26) | 1.678 L (27) | 3.828 M (28) | 1.949 L (29) | 3.816 M (30) |
| 2.149 L (31) | 3.781 M (32) | 2.220 L (33) | 3.750 M (34) | 2.351 L (35) |
| 3.701 M (36) | 2.430 L (37) | 3.688 M (38) | 2.401 L (39) | 3.690 M (40) |

-continued

| | | | | |
|---|---|---|---|---|
| 2.473 L (41) | 3.750 M (42) | 2.181 L (43) | 3.880 M (44) | 1.973 L (45) |
| 4.027 M (46) | 1.764 L (47) | 4.143 M (48) | 1.571 L (49) | 4.336 M (50) |
| 1.303 L (51) | 4.492 M (52) | 1.248 L (53) | 4.451 M (54) | 1.305 L (55) |
| 4.448 M (56) | 1.276 L (57) | 4.410 M (58) | 1.378 L (59) | 4.346 M (60) |
| 1.249 L (61) | 4.626 M (62) | 0.830 L (63) | 4.881 M (64) | 0.802 L (65) |
| 4.674 M (66) | 0.762 L (67) | 4.706 M (68) | 0.370 L (69) | |

Glass

C. 45° GREEN REFLECTOR IN HIGH INDEX GLASS

Thin-film stack 94 reflects S and P green wavelengths at 45° incidence angle in glass with a high index of refraction equal to 1.83. Because it is difficult to reflect P-polarization, a large number of thin-film layers are employed. Also, the variation of the 50% reflectance point both with respect to incidence angle and with respect to polarization is important. The variation should be held to a minimum over an angle range of 42.3° to 47.7° while at the same time the reflectance of green P-polarization is held at a high value. For this beam splitter, the blue wavelengths are not important since thin-film stack 92 removed them from the incident light.

Green reflector (thin-film stack 92) preferably has the following performance specifications:

1. Angle of incidence: 45°;
2. Averaging of 50% reflection points for S and P-polarization: 600 nm;
3. Difference between S and P 50% reflection points: <42 nm;
4. Shift in S and P 50% reflection points between 45° and 47.7°: <34 nm;
5. For the wavelength range from 500 to 575 nm, average transmittance of S-polarization <0.0001;
6. For the wavelength range from 520 to 575 nm, maximum transmittance of P-polarization <0.03 and average transmittance of P-polarization <0.015;
7. For the wavelength range from 625 to 700 nm, maximum reflectance of S-polarization <0.0075 and average reflectance <0.002; and
8. For the wavelength range from 625 to 700 nm, average reflectance of P-polarization <0.001.
9. Angle of incidence: 47.7° (50° in air);
10. For the wavelength range from 525 to 570 nm, average transmittance of S-polarization <0.4;
11. Angle of incidence: 42.3° (40° in air);
12. For the wavelength range from 555 to 576 nm, average transmittance of P-polarization <0.4;
13. For the wavelength range from 655 to 680 nm, average reflectance of S-polarization <0.004.

The foregoing are preferred construction materials for the green reflector:

Glass 1.83; L 1.46; and M 1.83. Thickness data are given in normal-incidence quarter-wave units at a wavelength of 600 nm:

Glass

| | | | | |
|---|---|---|---|---|
| 0.630 L (1) | 4.163 M (2) | 1.395 L (3) | 3.889 M (4) | 2.161 L (5) |
| 3.748 M (6) | 1.813 L (7) | 4.005 M (8) | 1.758 L (9) | 3.760 M (10) |
| 1.790 L (11) | 3.657 M (12) | 1.630 L (13) | 3.650 M (14) | 1.831 L (15) |
| 3.893 M (16) | 1.833 L (17) | 3.860 M (18) | 1.961 L (19) | 3.977 M (20) |
| 1.857 L (21) | 3.865 M (22) | 1.914 L (23) | 3.652 M (24) | 2.089 L (25) |
| 3.357 M (26) | 2.003 L (27) | 3.584 M (28) | 1.992 L (29) | 3.750 M (30) |
| 2.103 L (31) | 3.852 M (32) | 2.120 L (33) | 3.761 M (34) | 2.252 L (35) |
| 3.775 M (36) | 2.384 L (37) | 3.658 M (38) | 2.489 L (39) | 3.647 M (40) |
| 2.586 L (41) | 3.764 M (42) | 2.036 L (43) | 3.962 M (44) | 1.853 L (45) |
| 4.072 M (46) | 1.795 L (47) | 4.037 M (48) | 1.861 L (49) | 4.132 M (50) |
| 1.454 L (51) | 4.449 M (52) | 1.355 L (53) | 4.338 M (54) | 1.323 L (55) |
| 4.473 M (56) | 1.379 L (57) | 4.301 M (58) | 1.511 L (59) | 4.160 M (60) |
| 1.610 L (61) | 4.418 M (62) | 1.122 L (63) | 4.460 M (64) | 1.039 L (65) |
| 4.803 M (66) | 0.809 L (67) | 4.453 M (68) | 0.635 L (69) | |

Glass

In a highly preferred embodiment, the light valves have a dimension of 1"×1.78", the main polarizer and color beam splitter has a dimension of 4.5"×2.2"×1.5". The optical path equalization block has the dimensions of 1.5"×2.28"×1.5". The prepolarizer has the dimensions of 2"×3"×3". These dimensions were calculated assuming a beam expansion of 5° in air and 2.73° in glass. If the foregoing sizes are too small for satisfactory image quality, the dimensions can be scaled by a fixed factor. For example, if the height of the light valve needs to be 1.2" instead of 1.0", then all the dimensions and sizes should be multiplied by a factor of 1.2.

As can be appreciated from the foregoing, projection systems employing the color and polarization beam splitters according to the present invention have higher contrast ratios than previously obtained due to the use of high index of refraction glass along with color and polarization beam splitters which operate at 45°, which are parallel, and which are in the same index of refraction medium.

As can also be appreciated, color and polarization beam splitters according to the present invention eliminate the need for index of refraction oil prisms. Furthermore, the space occupied by a tank to hold the index of refraction liquid is eliminated. Also, color and polarization beam splitters operating at 45° take less space than beam splitters operating at higher angles of incidence. Furthermore, the high index of the glass employed produces a smaller optical path for a given physical path.

Various other advantages of the present invention will become apparent to those skilled in the art after having the benefit of studying the foregoing text and drawings, take in conjunction with the following claims.

What is claimed is:

1. A beam processing system, comprising:
    a polarizer that reflects a portion of a beam of radiation having a first polarization along an optical axis, the polarizer including a first thin-film stack sandwiched between first and second transmissive prisms, the first thin-film stack including alternating layers of first and second materials located between two prism interface layers, the first material comprising a material having a high index of refraction, the second material comprising a material having a low index of refraction, the two prism interface layers each having an index of refraction between those of the first and second materials;
    a first beam splitter oriented along the optical axis that reflects a first band of the beam of radiation and transmits a second and third band of the beam of radiation; and
    a second beam splitter oriented along the optical axis that reflects the second band of the beam of radiation and transmits the third band of the beam of radiation, the second beam splitter being oriented substantially parallel to and in close proximity with the first beam splitter to minimize system size and optical path requirements.

2. The system of claim 1, further comprising a prepolarizer that prepolarizes the beam of radiation prior to the beam of radiation reaching the polarizer.

3. The system of claim 2, wherein the prepolarizer is oriented orthogonally with respect to the polarizer such that a portion of the prepolarized beam of radiation having a second polarization is transmitted to the polarizer at an angle of about 90 degrees and is thereby received at the polarizer as a beam of radiation having the first polarization.

4. The system of claim 2, wherein the polarizer includes a thin-film stack, having an incidence angle of about 45°, and being sandwiched between first and second glass prisms having a high index of refraction.

5. The system of claim 1, wherein the first and second prisms are oriented substantially parallel to one another and are formed from a glass material having a high index of refraction.

6. The system of claim 5, wherein the glass material has an index of refraction of between 1.65 and 1.85.

7. The system of claim 6, wherein the glass material has an index of refraction of 1.83.

8. The system of claim 1, wherein the first beam splitter comprises a second thin-film stack sandwiched between the second prism and a third prism.

9. The system of claim 8, wherein the second thin-film stack comprises alternating layers of first and second materials located between two prism interface layers, the first material comprising a material having a high index of refraction, the second material comprising a material having a low index of refraction, the two prism interface layers each having an index of refraction between those of the first and second materials.

10. The system of claim 8, wherein the second and third prisms are oriented substantially parallel to one another and are formed from a glass material having a high index of refraction.

11. The system of claim 10, wherein the glass material has an index of refraction of between 1.65 and 1.85.

12. The system of claim 8, wherein the second beam splitter comprises a third thin-film stack sandwiched between the third prism and a fourth prism.

13. The system of claim 12, wherein the third thin-film stack comprises alternating layers of first and second materials located between two prism interface layers, the first material comprising a material having a high index of refraction, the second material comprising a material having a low index of refraction, the two prism interface layers each having an index of refraction between those of the first and second materials.

14. The system of claim 12, wherein the third and fourth prisms are oriented substantially parallel to one another and formed from a glass material having a high index of refraction.

15. The system of claim 14, wherein the glass material has an index of refraction of between 1.65 and 1.85.

16. The system of claim 1, wherein the first band of radiation comprises blue wavelength spectrum light, the second band of radiation comprises green wavelength spectrum light, and the third band of radiation comprises red wavelength spectrum light.

17. The system of claim 1, further comprising a plurality of light processors that each receive and process radiation reflected or transmitted from the first and second beam splitters and that each output the processed radiation through the first and second beam splitters.

18. The system of claim 17, wherein the plurality of light processors each comprise a light valve positioned in operative proximity to a ¼ wave plate that each receive light to be processed and that each transmit processed light through the first and second beam splitters and the polarizer.

19. The system of claim 17, wherein the processed radiation comprises both unmodulated and modulated radiation, the polarizer reflecting the unmodulated radiation and transmitting the modulated radiation for radiation projection purposes.

20. A multi-color light valve projection system, comprising:
a polarizer that receives and reflects a beam of radiation;
first, second and third light valves each operatively positioned to receive a predetermined bandwidth of the radiation;
a first beam splitter that reflects blue wavelength light to a first light valve and transmits red and green wavelength light;
a second beam splitter that reflects green wavelength light to a second light valve that transmits red wavelength light to a third light valve;
the polarizer and first and second beam splitters being oriented substantially parallel to one another and having indices of refraction that minimize reflection of P-polarized light and that maximize reflection of S-polarized light, and the polarizer and first and second beam splitters including a multi-layer film stack having alternating layers of first and second materials located between two prism interface layers, the first material comprising a material having a high index of refraction, the second material comprising a material having a low index of refraction, the two prism interface layers each having an index of refraction between those of the first and second materials.

21. The processor of claim 20 wherein the polarizer and the first and second beam splitters operate at an incidence angle of about 45°.

22. The system of claim 20 wherein the two prism interface layers each have an index of refraction of between 1.65 and 1.85.

23. A light processor, comprising:
a first beam splitter, oriented along an optical axis at an incidence angle of about 45 degrees, that receives a polarized beam of radiation transmitted along the optical axis, that reflects a first band of the beam of radiation, and that transmits second and third bands of the beam of radiation, the first beam splitter including a first thin-film stack sandwiched between first and second transmissive prisms, the first thin-film stack including alternating layers of first and second materials located between two prism interface layers, the first material comprising a material having a high index of refraction, the second material comprising a material having a low index of refraction, the two prism interface layers each having an index of refraction between those of the first and second materials; and
a second beam splitter, oriented along the optical axis at an incidence angle of about 45 degrees, that reflects the second band of the beam of radiation, and that transmits the third band of the beam of radiation, the second beam splitter being oriented in close proximity with the first beam splitter to minimize system size and optical path length requirements.

24. A beam processing system, comprising:
a prepolarizer for prepolarizing a beam of radiation;
a polarizer for receiving the beam of radiation and reflecting a portion of the beam of radiation having a first polarization along an optical axis;
a first beam splitter oriented along the optical axis for reflecting a first band of the beam of radiation and transmitting a second and third band of the beam of radiation; and a second beam splitter oriented along the optical axis for reflecting the second band of the beam of radiation and transmitting the third band of the beam of radiation, the second beam splitter being oriented substantially parallel to and in close proximity with the first beam splitter to minimize system size and optical path requirements;

wherein at least one of the polarizer, the first beam splitter and the second beam splitter include a thin-film stack sandwiched between first and second transmissive prisms, the thin-film stack including alternating layers of first and second materials located between two prism interface layers, the first material comprising a material having a high index of refraction, the second material comprising a material having a low index of refraction, the two prism interface layers each having an index of refraction between those of the first and second materials; and wherein the prepolarizer is oriented orthogonally with respect to the polarizer such that a portion of the prepolarized beam of radiation having a second polarization is transmitted to the polarizer at an angle of about 90 degrees and is thereby received at the polarizer as a beam of radiation having the first polarization.

25. The beam processing system of claim 24 further including a plurality of light processors that each receive and process radiation reflected or transmitted from the first and second beam splitters and that each output processed radiation through the first and second beam splitters.

26. The beam processing system of claim 22, wherein the plurality of light processors each comprise a light valve positioned in operative proximity to a ¼ wave plate that each receive light to be processed and that each transmit processed light through the first and second beam splitters and the polarizer.

* * * * *